US010207310B2

(12) United States Patent
Nakanishi et al.

(10) Patent No.: US 10,207,310 B2
(45) Date of Patent: Feb. 19, 2019

(54) METHOD FOR MANUFACTURING VEHICLE STRUCTURAL MEMBER (71) Applicant: TOYODA IRON WORKS CO., LTD., Toyota-shi, Aichi (JP)

(72) Inventors: Makoto Nakanishi, Toyota (JP); Yutaka Yamada, Toyota (JP)

(73) Assignee: TOYODA IRON WORKS CO., LTD., Toyota-shi (JP)

( * ) Notice: Subject to any disclaimer, the term of this patent is extended or adjusted under 35 U.S.C. 154(b) by 197 days.

(21) Appl. No.: 15/128,618

(22) PCT Filed: Aug. 8, 2014

(86) PCT No.: PCT/JP2014/071108
§ 371 (c)(1),
(2) Date: Sep. 23, 2016

(87) PCT Pub. No.: WO2015/145799
PCT Pub. Date: Oct. 1, 2015

(65) Prior Publication Data
US 2017/0106429 A1   Apr. 20, 2017

(30) Foreign Application Priority Data

Mar. 26, 2014 (JP) .................... 2014-064554

(51) Int. Cl.
*B62D 21/02* (2006.01)
*B21D 47/02* (2006.01)
(Continued)

(52) U.S. Cl.
CPC ............ *B21D 47/02* (2013.01); *B21C 23/002* (2013.01); *B21D 53/88* (2013.01); *B60R 19/18* (2013.01);
(Continued)

(58) Field of Classification Search
CPC ...... B62D 21/152; B62D 21/15; B62D 21/11; B60R 19/02; B60R 19/023; B60R 19/04;
(Continued)

(56) References Cited

U.S. PATENT DOCUMENTS

2011/0015902 A1   1/2011   Cheng et al.

FOREIGN PATENT DOCUMENTS

| JP | H08-168814 A | 7/1996 |
| JP | H08-174047 A | 7/1996 |
| JP | H11-192964 A | 7/1999 |

OTHER PUBLICATIONS

English Translation of Japanese Patent Publication, JPH11192964.*
(Continued)

*Primary Examiner* — Jun Yoo
(74) *Attorney, Agent, or Firm* — Oliff PLC (57) ABSTRACT A method for manufacturing a vehicle structure member by using a hollow extruded material that has a pair of side plates and a plurality of connecting plates connecting the side plates together and that has a quadrilateral closed section and a longitudinal shape, such that a width dimension of the vehicle structure member, which is a distance between the side plates, varies in a longitudinal direction of the vehicle structure member, the method including: an extrusion molding step of producing the hollow extruded material with the connecting plates each having a bent shape by extrusion molding; and a widening step of increasing the width dimension by increasing the distance between the side plates partially in the longitudinal direction so as to flatten the connecting plates having the bent shape.

2 Claims, 6 Drawing Sheets (51) Int. Cl.
    *B62D 21/15*     (2006.01)
    *B62D 25/08*     (2006.01)
    *B60R 19/18*     (2006.01)
    *B21C 23/00*     (2006.01)
    *B21D 53/88*     (2006.01)
    *B62D 29/00*     (2006.01)

(52) U.S. Cl.
    CPC ......... *B62D 21/152* (2013.01); *B62D 25/082* (2013.01); *B62D 29/008* (2013.01); *B60R 2019/182* (2013.01)

(58) Field of Classification Search
    CPC ..... B60R 19/14; B60R 19/18; B60R 19/1806; B60R 19/1813; B60R 19/1826; B60R 19/34; B60R 19/24; F16F 7/128; E04C 2003/0439; B60G 7/001
    See application file for complete search history.

(56) References Cited

OTHER PUBLICATIONS

May 26, 2017 Office action issued in Chinese Patent Application No. 20148077469.3.
Sep. 20, 2016 Office Action issued in Japanese Patent Application No. 2014-064554.
Oct. 14, 2014 International Search Report issued in Patent Application No. PCT/JP2014/071108.
Oct. 27, 2017 Extended Search Report issued in European Patent Application No. 14886797.1.

* cited by examiner

FIG.3A
EXTRUSION MOLDING STEP

FIG.3B
PUNCHING STEP

FIG.3C
PRESS WIDENING STEP

FIG.3D
BENDING FORMING STEP

METHOD FOR MANUFACTURING VEHICLE STRUCTURAL MEMBER

I. TECHNICAL FIELD

The present invention relates to hollow vehicle structure members such as a bumper reinforcement, a floor brace, a tower bar, and a cross member, and more particularly to techniques of manufacturing a vehicle structure member whose width dimension varies in its longitudinal direction by using a hollow extruded material.

BACKGROUND ART

Techniques are known in the art in which a vehicle structure member is manufactured by using a hollow extruded material that has a pair of side plates and a plurality of connecting plates connecting the side plates together and that has a quadrilateral closed section and a longitudinal shape, such that the width dimension of the vehicle structure member, or the distance between the side plates, varies in the longitudinal direction of the vehicle structure member. A method for manufacturing a vehicle structure member described in Patent Document 1 is an example of such techniques. In this method, easily bent shape portions such as notches are formed in a pair of connecting plates of a hollow extruded material having a quadrilateral section, and a pair of side plates are pressed by press working so that the connecting plates are partially bent and deformed, whereby the hollow extruded material is thus partially compressed.

RELATED ART DOCUMENTS

Patent Documents

Patent Document 1: Japanese Patent Application Publication No. H08-174047

II. SUMMARY OF THE INVENTION

Problem to be Solved by the Invention

In the case of compressing the hollow extruded material by using the easily bent shape portions such as notches, it is difficult to appropriately bend and deform the connecting plates even by using the easily bent shape portions such as notches, if the original hollow extruded material has a small width dimension and has a large thickness in order to ensure predetermined strength as in the case where the hollow extruded material is made of aluminum. There is a risk that the hollow extruded material may crack or fracture. Moreover, it is difficult to finely set the compressed shape in the case where the hollow extruded material is to be formed such that space is left between the side plates.

The present invention was developed in view of the above circumstances and it is an object of the present invention to enable even a vehicle structure member having a portion with a relatively small width dimension to be appropriately manufactured by using a hollow extruded material, and to enable the width dimension to be finely set with high accuracy such that space is present between a pair of side plates.

Solution to Problem

To achieve the above object, a first aspect of the invention provides a method for manufacturing a vehicle structure member by using a hollow extruded material that has a pair of side plates and a plurality of connecting plates connecting the side plates together and that has a quadrilateral closed section and a longitudinal shape, such that a width dimension of the vehicle structure member, which is a distance between the side plates, varies in a longitudinal direction of the vehicle structure member, the method characterized by comprising: (a) an extrusion molding step of producing the hollow extruded material with the connecting plates each having a bent shape by extrusion molding; and (b) a widening step of increasing the width dimension by increasing the distance between the side plates partially in the longitudinal direction so as to flatten the connecting plates having the bent shape.

A second aspect of the invention provides the method recited in the first aspect of the invention, characterized in that in the widening step, a through hole is formed in one of the side plates, a punch is inserted through the through hole, and with the one side plate being held, the punch is moved to contact the other side plate to move the side plates away from each other (separate the side plates further from each other), so that the width dimension is increased.

A third aspect of the invention provides the method recited in the first or second aspect of the invention, characterized in that the connecting plates each have a perpendicular portion formed in its intermediate portion in an attitude perpendicular to the side plates, and have bends at two positions on both sides of the perpendicular portion.

Advantageous Effects of the Invention

According to the method for manufacturing the vehicle structure member, the hollow extruded material in which each of the connecting plates has the bent shape is produced by extrusion molding, and the width dimension is increased by increasing the distance between the side plates partially in the longitudinal direction so as to flatten the connecting plates having the bent shape. Accordingly, even the vehicle structure member having a relatively small width dimension can be appropriately manufactured from the hollow extruded material. Moreover, since the width dimension is increased by increasing the distance between the side plates, a widened shape can be finely set with high accuracy when an outer side plate is pressed against a forming surface etc. of a die to increase the width dimension, for example.

In the second aspect of the invention, a through hole is formed in one of the side plates, the punch is inserted through the through hole, and with the one side plate being held, the punch is moved to contact the other side plate to move the side plates away from each other, so that the width dimension is increased. Accordingly, the vehicle structure member can be manufactured inexpensively by simple facilities as compared to the case where the hollow extruded material is widened by hydroforming etc.

In the third aspect of the invention, the connecting plates each have the perpendicular portion formed in its intermediate portion in an attitude perpendicular to the side plates, and have the bends at two positions on both sides of the perpendicular portion. Accordingly, a change in angle at each bend which is caused by the widening process is smaller than in the case of L-shaped connecting plates having a bend at only one position. This reduces damage that is caused by work hardening etc. at the time the connecting plates are extended and deformed, and more appropriately reduces cracking, breakage, etc. Moreover, each of the connecting plates has the perpendicular portion formed in an attitude perpendicular to the side plates. Accordingly, when a load is applied such that the side plates are moved toward each other in the event of collision of the vehicle, for example, the load can be appropriately received by the perpendicular portions and appropriately absorbed by deformation of the perpendicular portions to alleviate the shock.

BRIEF DESCRIPTION OF DRAWINGS

FIGS. 2A and 2B are sectional views of two positions in the vehicle bumper reinforcement in FIG. 1. Specifically.

FIGS. 6A and 6B are sectional views corresponding to FIGS. 2A and 2B.

FIGS. 7A and 7B are sectional views corresponding to FIGS. 2A and 2B.

FIGS. 8A and 8B are sectional views corresponding to FIGS. 2A and 2B.

FIGS. 9A and 9B are sectional views corresponding to FIGS. 2A and 2B.

MODES FOR CARRYING OUT THE INVENTION

The present invention is preferably applied to manufacturing of a hollow vehicle structure member such as a vehicle bumper reinforcement, a floor brace, a tower bar, and a cross member by using a hollow extruded material. The hollow extruded material is an extruded material having a quadrilateral tubular shape and made of aluminum, an aluminum alloy, or other metals. The connecting plates include a pair of outer connecting plates that together with the pair of side plates form the quadrilateral closed section. However, a rib (partition wall) for reinforcement etc. may be provided as the connecting plate in the hollow extruded material so as to be parallel to a longitudinal direction of the hollow extruded material. Flanges extending outward may be formed on both sides of at least one of the pair of side plates. In the widening step, the other side plate may be moved away from the one plate with the flanges being held.

It is desirable that the pair of side plates be substantially parallel to each other. However, one of the side plates may be tilted with respect to the other as viewed in section perpendicular to the longitudinal direction. A portion where the width dimension is to be increased can be in various forms. For example, the portion where the width dimension is to be increased may be a longitudinal end of the vehicle structure member, or a middle portion in the longitudinal direction of the vehicle structure member. The portion where the width dimension is to be increased is determined as appropriate in accordance with the shape, required strength, etc. of the vehicle structure member. The width dimension may be increased at a plurality of positions in the longitudinal direction.

It is appropriate that the bent shape of the connecting plates be such that the connecting plate has the perpendicular portion formed in its intermediate portion in an attitude perpendicular to the pair of side plates and has the bends at two positions on both sides of the perpendicular portion. However, the bent shape of the connecting plates can be in various forms. For example, an L-shaped connecting plate having a bend formed at only one position may be used. Alternatively, the connecting plate may have a curved shape or may have bends at three or more positions. The connecting plates having the bent shape are flattened in the widening step. However, it is difficult to make the connecting plates completely flat, and the connecting plates need only be widened so as to reduce the extent to which the connecting plates are bent. For example, in the widening step, the pair of side plates are separated further from each other by press working etc. However, the bends of the connecting plates may be pressed and flattened to increase the width dimension of the pair of side plates. Alternatively, the pair of side plates may be separated further from each other by press working etc. while pressing and flatting the bends. It is desirable to perform the widening step on a linear hollow extruded material. However, for example, for those vehicle structure members whose intended final shape is a generally curved shape or a partially bent shape such as a vehicle bumper reinforcement, the hollow extruded material may first be bent and formed into a predetermined shape and then subjected to the widening step to partially increase the width dimension.

In the second aspect of the invention, a through hole is formed in one side plate, the punch is inserted through the through hole, and the width dimension is increased by press working. However, in the case of carrying out the first aspect of the invention, the width dimension can be increased in various forms. For example, the through hole may not be formed and the width dimension may be increased by hydroforming by applying an internal pressure. Alternatively, the width dimension may be increased by holding flanges formed on both sides of the pair of side plates and pulling the side plates by press working. Alternatively, a slide die etc. may be inserted from an opening at a longitudinal end of the hollow extruded material to separate the pair of side plates further away from each other.

Embodiments

Embodiments of the present invention will be described in detail below with reference to the accompanying drawings.

In the following embodiments, the dimensions, dimension ratios, angles, thicknesses, etc. of each part are not necessarily shown accurately.

Figure 1:
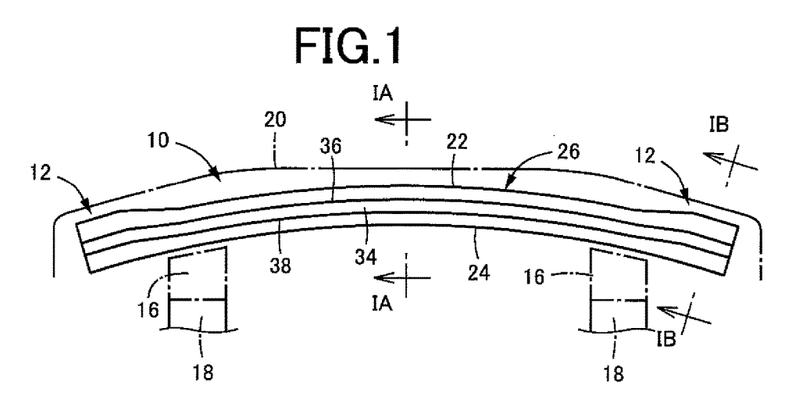
FIG. 1 is a plan view of a vehicle bumper reinforcement mounted on a vehicle, as viewed from above and the vehicle bumper reinforcement being manufactured according to the present method.

FIG. 1 is a schematic plan view of a vehicle front bumper reinforcement 10 mounted on a vehicle, as viewed from above. This vehicle bumper reinforcement 10 has a longitudinal shape that is long in the lateral direction of the vehicle, or the lateral direction in FIG. 1, and has a gently curved shape that is curved in the middle of the lateral direction of the vehicle toward the front side of the vehicle, as viewed in plan in FIG. 1. The vehicle bumper reinforcement 10 is fixed to right and left side members 18, or vehicle body-side members, via crash boxes 16 at its both ends in the lateral direction of the vehicle, namely at a pair of tilted ends 12 that are gently tilted rearward toward the vehicle body side. The vehicle bumper reinforcement 10 is symmetrical and the right and left crash boxes 16 and the right and left side members 18 are arranged substantially symmetrically. A bumper 20 made of a synthetic resin is placed on the outside of the vehicle bumper reinforcement 10, namely on the front side of the vehicle. The vehicle bumper reinforcement 10 is an example of the vehicle structure member.

Figure 2A:
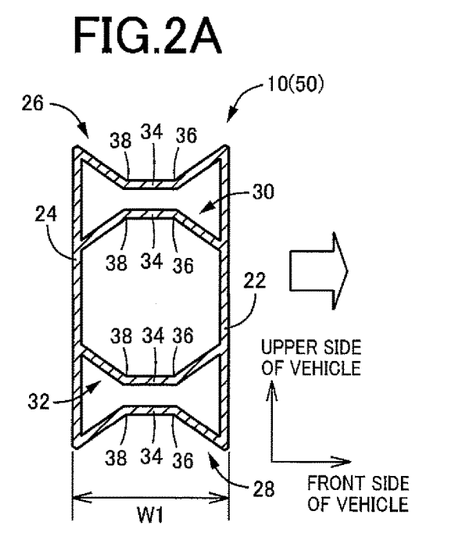
FIG. 2A is a sectional view of a narrow portion having a relatively narrow width dimension, taken along line IA-IA and viewed in the direction of arrows in FIG. 1.
Figure 2B:
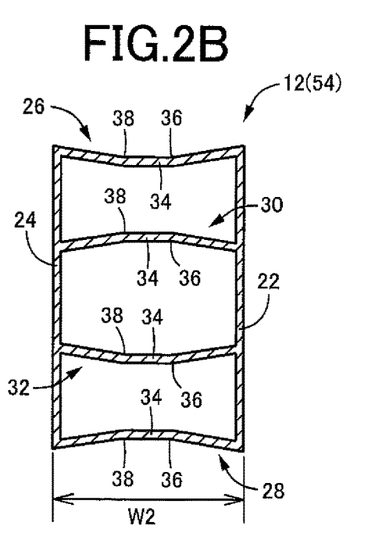
FIG. 2B is a sectional view of a wide portion having a relatively large width dimension, taken along line IB-IB and viewed in the direction of arrows in FIG. 1.

The vehicle bumper reinforcement 10 has a hollow shape with a quadrilateral closed section. FIG. 2A is a sectional view of a narrow portion having a relatively narrow width dimension W1, taken along line IA-IA and viewed in the direction of arrows in FIG. 1. FIG. 2B is a sectional view of a wide portion having a relatively large width dimension W2, taken along line IB-IB and viewed in the direction of arrows in FIG. 1. As can be seen from these sectional views, the quadrilateral closed section generally having a substantially quadrilateral shape (in the embodiment, a rectangular shape) is formed by an outer side plate 22 located on the outer side (front side) of the vehicle, an inner side plate 24 located on the vehicle body side, and an upper connecting plate 26 and a lower connecting plate 28 which connect the upper ends and lower ends of the outer and inner side plates 22, 24. A pair of reinforcing ribs (partition walls) 30, 32 are placed between the upper and lower connecting plates 26, 28 so as to connect the outer and inner side plates 22, 24. The vehicle bumper reinforcement 10 is an extrudate of aluminum, and the outer side plate 22, the inner side plate 24, the upper connecting plate 26, the lower connecting plate 28, and the ribs 30, 32 are together formed as a single-piece material. This single-piece material has a constant sectional shape substantially the same as the sectional shape shown in FIG. 2A except the tilted ends 12 at both longitudinal ends of the single-piece material, and the distance between the outer and inner side plates 22, 24 is increased in the tilted ends 12 so that the single-piece material has a larger width dimension W2 in the tilted ends 12. The ribs 30, 32 together with the upper and lower connecting plates 26, 28 form the plurality of connecting plates.

The outer side plate 22 and the inner side plate 24 have the shape of a substantially flat plate gently curved in the lateral direction of the vehicle and are arranged substantially parallel to each other in a substantially vertical attitude. Each of the upper connecting plate 26, the lower connecting plate 28, and the ribs 30, 32 has a bent shape. Namely, each of the upper connecting plate 26, the lower connecting plate 28, and the ribs 30, 32 has, in its intermediate portion, a substantially horizontal perpendicular portion 34 formed in an attitude substantially perpendicular to the outer and inner side plates 22, 24 and has two bends 36, 38 on both sides of the perpendicular portion 34. Specifically, the upper connecting plate 26 and the lower rib 32 have substantially the same sectional shape. Namely, in the upper connecting plate 26 and the lower rib 32, the perpendicular portions 34 are displaced so as to be translated downward, and the upper connecting plate 26 and the lower rib 32 have tilted portions on the front and rear sides of the pair of bends 36, 38 which are tilted obliquely upward and connected to the outer and inner side plates 22, 24. The lower connecting plate 28 and the upper rib 30 have substantially the same sectional shape. Namely, in the lower connecting plate 28 and the upper rib 30, the perpendicular portions 34 are displaced so as to be translated upward, and the lower connecting plate 28 and the upper rib 30 have tilted portions on the front and rear sides of the pair of bends 36, 38 which are tilted obliquely downward and connected to the outer and inner side plates 22, 24.

Figure 5:
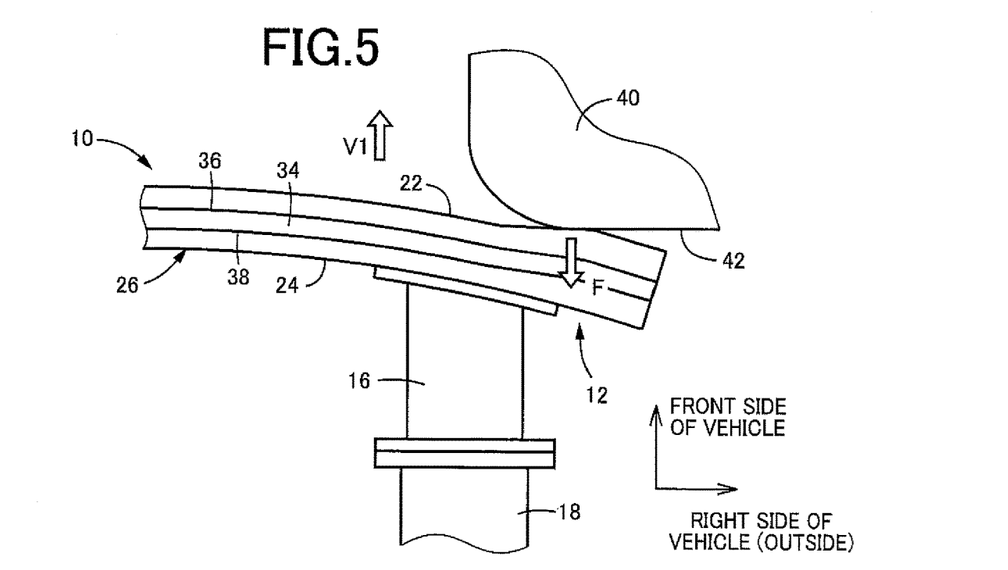
FIG. 5 is a plan view illustrating a small overlap offset collision in which an overlap between the vehicle and a crash barrier is small.

The narrow portion shown in FIG. 2A and the wide portion shown in FIG. 2B have the different width dimensions W1, W2 due to the difference in extent to which the upper connecting plate 26, the lower connecting plate 28, and the ribs 30, 32 are bent. The narrow portion shown in FIG. 2A and the wide portion shown in FIG. 2B have substantially the same length dimension along the bent shape, regardless of the difference between the width dimensions W1, W2. That is, in the wide portion of FIG. 2B, the upper connecting plate 26, the lower connecting plate 28, and the ribs 30, 32 are flattened, so that the bend angle of the bends 36, 38 is reduced, and the outer side plate 22 is moved away from the inner side plate 24 toward the front side of the vehicle accordingly. Since the outer side plate 22 is thus moved away from the inner side plate 24 toward the front side of the vehicle at the tilted ends 12, the outer side plate 22 extends substantially perpendicular to the direction in which the vehicle travels, as can be seen from FIG. 5. Shock absorbing performance of the crash boxes 16 can thus be appropriately achieved. FIG. 5 is a plan view showing an offset collision in which the right front part of the vehicle is caused to crash into a crash barrier 40 having a crash surface 42 at a predetermined vehicle speed V1. This shows a small overlap offset collision in which an overlap (overlap in the lateral direction of the vehicle) between the crash barrier 40 and the vehicle bumper reinforcement 10 is small. Since the outer side plate 22 in the crash part is substantially perpendicular to the direction in which the vehicle travels, a load F that is applied by the crash barrier 40 is substantially parallel to the longitudinal direction of the vehicle, and the crash box 16 is appropriately compressively deformed in its axial direction, whereby predetermined shock absorbing performance can be achieved.

Figure 11:
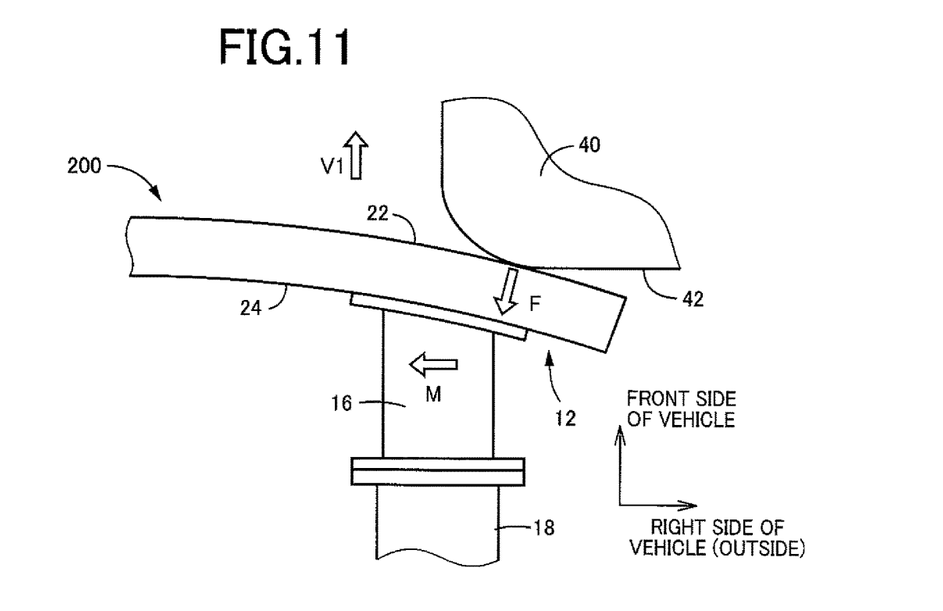
FIG. 11 is a plan view corresponding to FIG. 5, illustrating a small overlap offset collision in the case of a vehicle bumper reinforcement having a constant width dimension along the entire length up to its longitudinal ends.

On the other hand, in the case where the width dimension between the outer side plate 22 and the inner side plate 24 has a constant value W1 as in a vehicle bumper reinforcement 200 shown in FIG. 11, a load F is applied toward the inside of the vehicle due to the tilt of the outer side plate 22. Accordingly, the applied load F has a component in the lateral direction of the vehicle, and the crash box 16 is subjected to an inward (counterclockwise) moment M toward the inside of the vehicle and tends to buckle inward, which impairs shock absorbing performance.

In the vehicle bumper reinforcement 10 of the present embodiment, each of the upper connecting plate 26, the lower connecting plate 28, and the ribs 30, 32 which connect the outer side plate 22 and the inner side plate 24 together has, in its intermediate portion, the perpendicular portion 34 formed in an attitude perpendicular to the side plates 22, 24. Accordingly, when the outer side plate 22 is moved toward the inner side plate 24 by the applied load F in the event of collision of the vehicle, the applied load F can be appropriately received by the perpendicular portions 34 and appropriately absorbed by deformation of the perpendicular portions 34 to alleviate the shock.

Figure 3A:
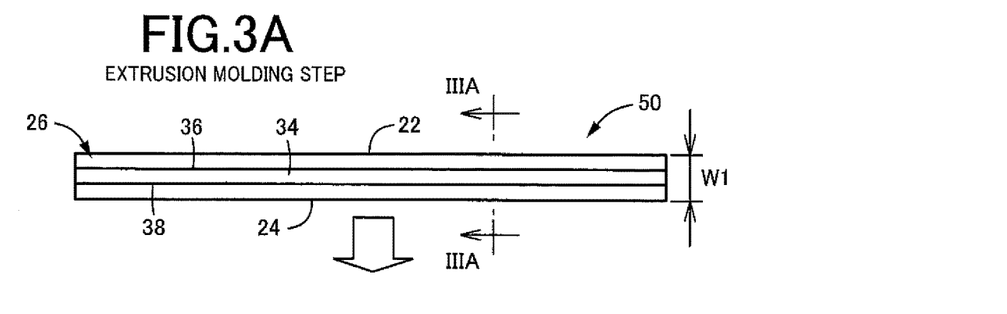
FIGS. 3A to 3D are plan views corresponding to FIG. 1, illustrating process charts of a manufacturing process for the vehicle bumper reinforcement in FIG. 1.

An example of a method for manufacturing the vehicle bumper reinforcement 10 configured as described above will be described below based on the process charts of the manufacturing process in FIGS. 3A to 3D. FIGS. FIGS. 3A to 3D are plan views corresponding to FIG. 1. FIG. 3A shows an extrusion molding step, in which a linear hollow extruded material 50 having a constant quadrilateral closed section, which is the same as the quadrilateral closed section of FIG. 2A, along its entire length is produced by extrusion molding by using an aluminum material. FIG. 2A is also a sectional view of the hollow extruded material 50, namely a sectional view taken along line IIIA-IIIA and viewed in the direction of arrows in FIG. 3A.

Figure 3B:
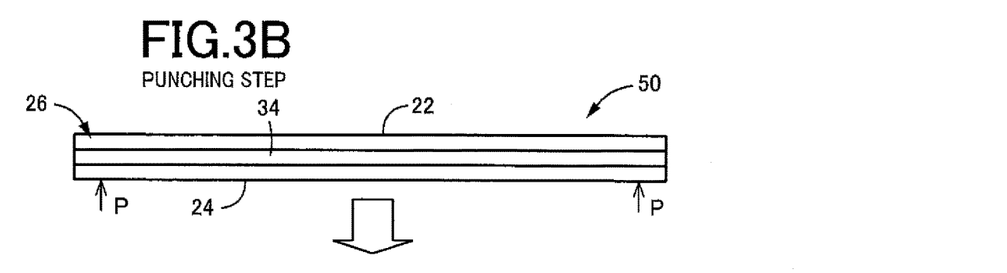
Figure 4:
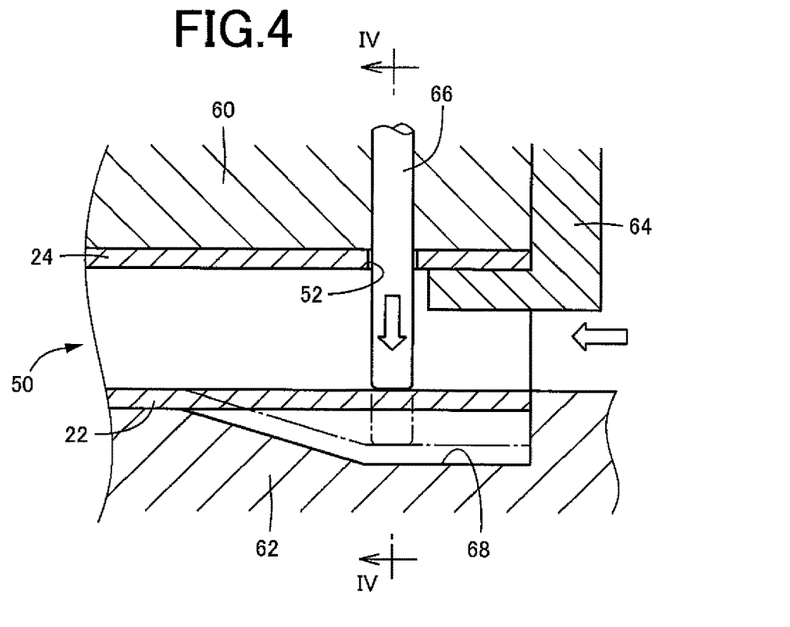
FIG. 4 is a sectional view specifically illustrating a process of increasing the width dimension of ends of a hollow extruded material by press working in a press widening step of FIG. 3C.
Figure 10:
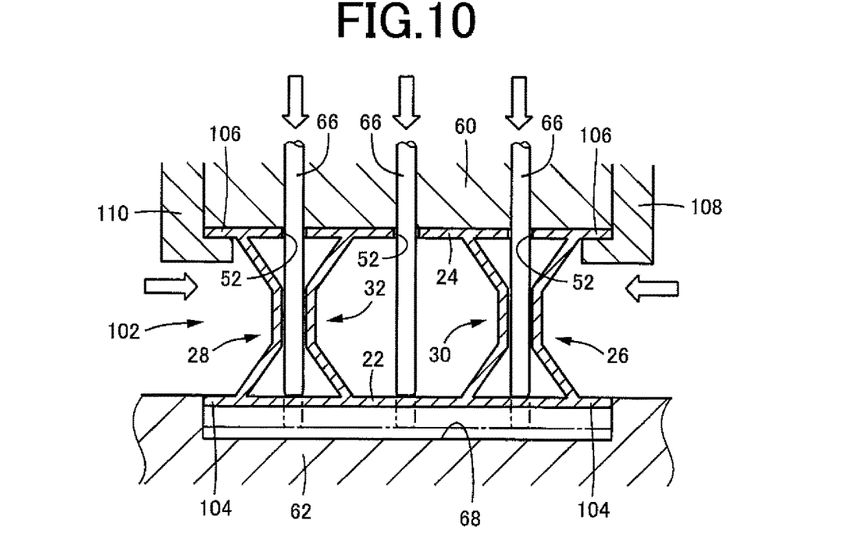
FIG. 10 is a sectional view specifically illustrating a process of increasing the width dimension of a hollow extruded material by press working in a press widening step in the embodiment of FIGS. 9A and 9B.

FIG. 3B shows a punching step, in which through holes 52 (see FIG. 4) are formed by laser machining, press punching, etc. in both longitudinal ends of the inner side plate 24 where the width dimension is to be increased to W2. As shown in the sectional view of FIG. 10, either one through hole 52 or a plurality of through holes 52 separated from each other in the longitudinal direction of the hollow extruded material 50 (in FIG. 4, one through hole 52) is formed between the upper connecting plate 26 and the rib 30, between the ribs 30, 32, and between the rib 32 and the lower connecting plate 28. FIG. 10 is the sectional view corresponding to the section taken along line IV-IV and viewed in the direction of arrows in FIG. 4, showing another embodiment in which flanges 104, 106 extending outward are formed on both sides of the outer and inner side plates 22, 24. In this embodiment as well, through holes 52 are formed in a manner similar to that in FIG. 10. Arrows P in FIG. 3B show the positions where the through holes 52 are to be formed.

Figure 3C:
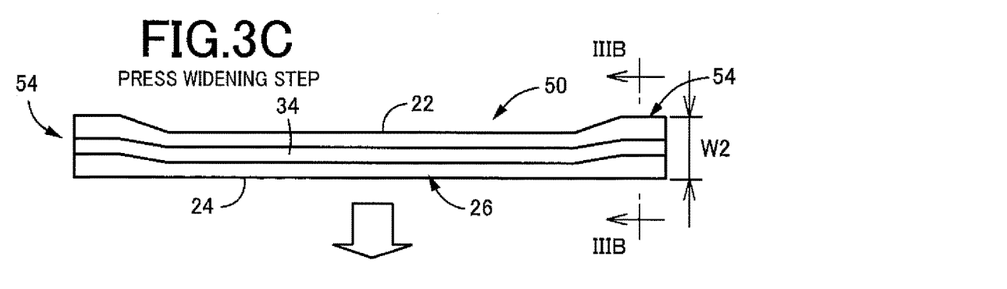
Figure 3D:
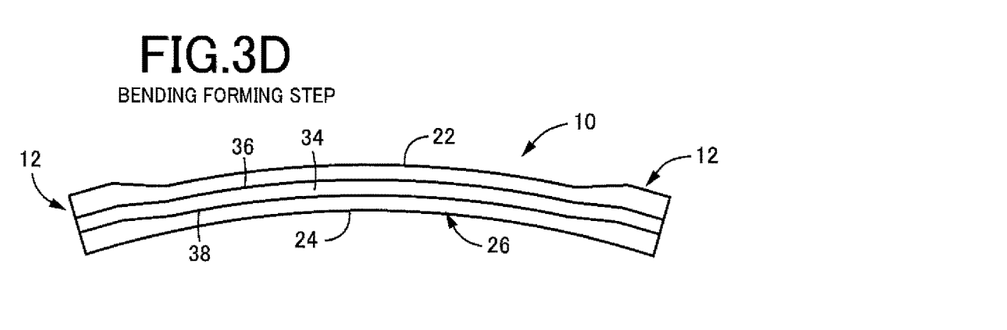

FIG. 3C shows a press widening step, in which widened portions 54 corresponding to the wide tilted ends 12 are formed by separating the outer side plate 22 further from the inner side plate 24 in both ends of the hollow extruded material 50 by press deformation so as to increase the width dimension to W2. FIG. 4 is a sectional view showing one end of the hollow extruded material 50, specifically illustrating the press widening step. The lateral direction in FIG. 4 corresponds to the longitudinal direction of the hollow extruded material 50. In the press widening step, the hollow extruded material 50 is first positioned and held by a pair of dies 60, 62, and a slide die 64 is inserted into an opening of the hollow extruded material 50 in the longitudinal direction of the hollow extruded material 50 by a cam mechanism etc. so as to position and hold the inner side plate 24 between the slide die 64 and the die 60. A punch 66 is disposed in the die 60 such that the punch 66 can advance and withdraw in its axial direction. The punch 66 is inserted through the through hole 52 so as to contact the inner side surface of the outer side plate 22, and the punch 66 is further advanced to press and deform the outer side plate 22 against a forming surface 68 of the die 62. The outer side plate 22 is thus separated further from the inner side plate 24 to increase the width dimension to W2. The widened portion 54 having a widened shape corresponding to the forming surface 68, namely having a width dimension continuously gradually changed from W1 to W2, is formed in this manner as shown by a long dashed short dashed line.

In the press widening step, the upper connecting plate 26, the lower connecting plate 28, and the ribs 30, 32 each having the bent shape are extended and flattened from the bent shape as shown in FIG. 2B. The width dimension is increased to W2 by this flattening process. Since each of the upper connecting plate 26, the lower connecting plate 28, and the ribs 30, 32 has the bends 36, 38 at two positions on both sides of the perpendicular portion 34, a change in angle at each bend 36, 38 which is caused by the widening process is smaller than in the case where each of the upper connecting plate 26, the lower connecting plate 28, and the ribs 30, 32 has a bend at only one position. This reduces damage that is caused by work hardening etc. at the time the upper connecting plate 26, the lower connecting plate 28, and the ribs 30, 32 are extended and deformed. The long dashed short dashed line in FIG. 4 shows the outer side plate 22 deformed along the forming surface 68 by the punch 66. In the present embodiment, the punching step in FIG. 3B and the press widening step in FIG. 3C correspond to the widening step. FIG. 2B is also a sectional view of the widened portion 54 in both ends of the hollow extruded material 50, namely a sectional view taken along line IIIB-IIIB and viewed in the direction of arrows in FIG. 3C.

Subsequently, the slide die 64 is withdrawn and the dies 60, 62 are opened to take the hollow extruded material 50 having the widened portions 54 with the width dimension W2 formed in both ends out of the dies 60, 62. In a bending forming step of FIG. 3D, the hollow extruded material 50 is bent and formed into a curved shape by press working. The intended vehicle bumper reinforcement 10 is thus manufactured. The punching step of FIG. 3B and the press widening step of FIG. 3C may be performed after the bending forming step of FIG. 3D.

According to the method for manufacturing the vehicle bumper reinforcement 10 of the present embodiment, the hollow extruded material 50 in which each of the upper connecting plate 26, the lower connecting plate 28, and the ribs 30, 32 which connect the outer and inner side plates 22, 24 together has the bent shape is produced by extrusion molding, and the outer side plate 22 is partially separated further from the inner side plate 24 in both longitudinal ends of the hollow extruded material 50 so as to flatten the upper connecting plate 26, the lower connecting plate 28, and the ribs 30, 32, whereby the width dimension is increased to W2. Accordingly, even the vehicle bumper reinforcement 10 having a relatively small width dimension W1 in its intermediate portion in the longitudinal direction of the vehicle bumper reinforcement 10 can be appropriately manufactured from the hollow extruded material 50 while reducing cracking, breakage, etc.

Since the outer side plate 22 is partially separated further from the inner side plate 24 and is pressed against the forming surface 68 of the die 62 to increase the width dimension to W2, the widened shape can be finely set with high accuracy by the forming surface 68.

When the hollow extruded material 50 is partially widened, the through holes 52 are formed in the inner side plate 24 at the ends of the hollow extruded material 50 which are to be widened, and the punches 66 are inserted through the through holes 52. With the inner side plate 24 being held between the slide die 64 and the die 60, the punches 66 are moved to contact the outer side plate 22 to move the outer side plate 22 away from the inner side plate 24 by press working and to increase the width dimension. Accordingly, the vehicle bumper reinforcement 10 can be manufactured inexpensively by simple facilities as compared to the case where the hollow extruded material 50 is widened by hydroforming etc.

Since each of the upper connecting plate 26, the lower connecting plate 28, and the ribs 30, 32 which connect the outer and inner side plates 22, 24 together has the bends 36, 38 at two positions on both sides of the perpendicular portion 34, a change in angle at each bend 36, 38 which is caused by the widening process is smaller than in the case of L-shaped connecting plates having a bend at only one position. This reduces damage that is caused by work hardening etc. at the time the upper connecting plate 26, the lower connecting plate 28, and the ribs 30, 32 are extended and deformed, and more appropriately reduces cracking, breakage, etc.

Each of the upper connecting plate 26, the lower connecting plate 28, and the ribs 30, 32 has the perpendicular portion 34 formed in an attitude perpendicular to the outer and inner side plates 22, 24. Accordingly, when the outer side plate 22 is moved toward the inner side plate 24 by the applied load F in the event of collision of the vehicle, the applied load F can be appropriately received by the perpendicular portions 34 and appropriately absorbed by deformation of the perpendicular portions 34 to alleviate the shock along the entire length of the vehicle bumper reinforcement 10 including the tilted ends 12.

Other embodiments of the present invention will be described below. In the following embodiments, substantially the same portions as those of the above embodiment are denoted with the same reference characters, and detailed description thereof will be omitted.

Figure 6A:
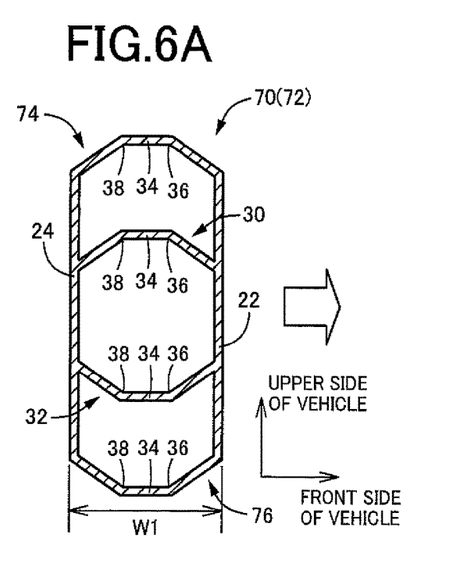
FIGS. 6A and 6B are sectional views of another vehicle bumper reinforcement manufactured according to the present method.
Figure 6B:
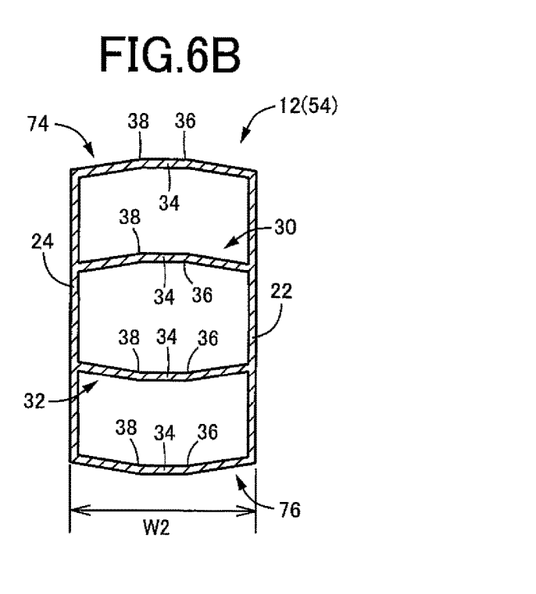

FIGS. 6A and 6B are sectional views corresponding to FIGS. 2A and 2B. A vehicle bumper reinforcement 70 is different from the above embodiment in that the perpendicular portion 34 of an upper connecting plate 74 protrudes upward and the perpendicular portion 34 of a lower connecting plate 76 protrudes downward. In such a vehicle bumper reinforcement 70 as well, a hollow extruded material 72 having a narrow sectional shape shown in FIG. 6A is widened in its both longitudinal ends as shown in FIG. 6B in a manner similar to that of the above embodiment. Widened portions 54 in which the outer side plate 22 has been bent toward the front side of the vehicle so as to be separated further from the inner side plate 24 are thus formed, and the tilted ends 12 are formed by the widened portions 54. In the present embodiment, the outer side plate 22 may be separated further from the inner side plate 24 and the hollow extruded material 72 may be widened by pressing the perpendicular portions 34 of the upper connecting plate 74 protruding upward and the lower connecting plate 76 protruding downward toward each other.

Figure 7A:
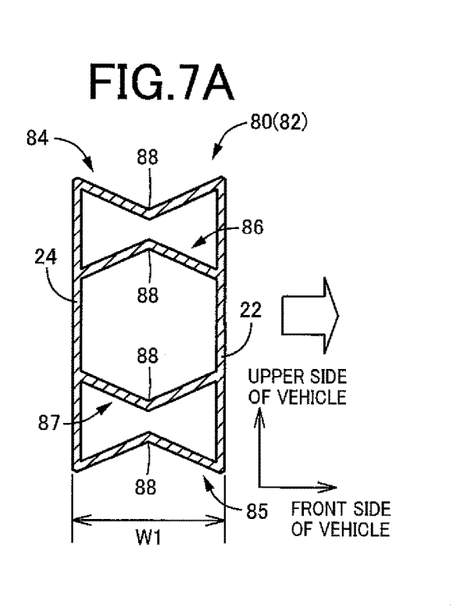
FIGS. 7A and 7B are sectional views of still another vehicle bumper reinforcement manufactured according to the present method.
Figure 7B:
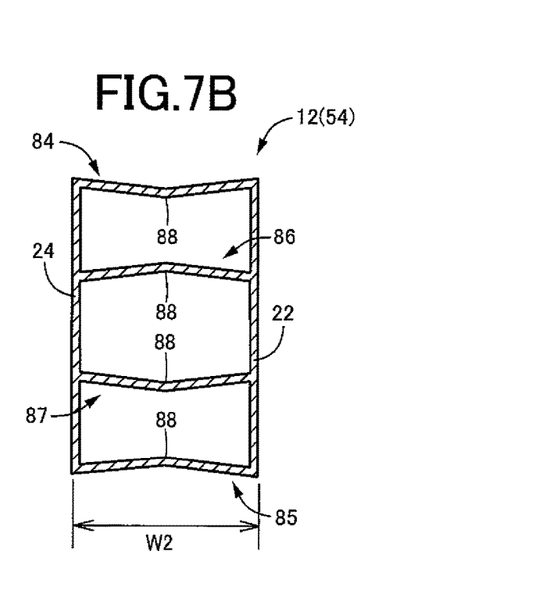

FIGS. 7A and 7B are sectional views corresponding to FIGS. 2A and 2B. A vehicle bumper reinforcement 80 is different from the above embodiment in that each of an upper connecting plate 84, a lower connecting plate 85, and ribs 86, 87 has a bend 88 at one position near the middle and thus has a substantially L-shaped bent shape in section and does not have the perpendicular portion 34. In such a vehicle bumper reinforcement 80 as well, a hollow extruded material 82 having a narrow sectional shape shown in FIG. 7A is widened in its both longitudinal ends as shown in FIG. 7B in a manner similar to that of the above embodiment. Widened portions 54 in which the outer side plate 22 has been bent toward the front side of the vehicle so as to be separated further from the inner side plate 24 are thus formed, and the tilted ends 12 are formed by the widened portions 54.

Figure 8A:
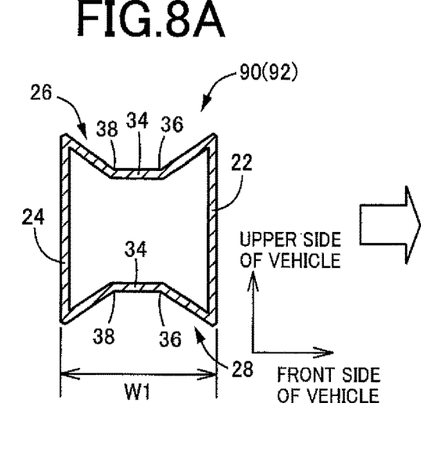
FIGS. 8A and 8B are sectional views of still another vehicle bumper reinforcement manufactured according to the present method.
Figure 8B:
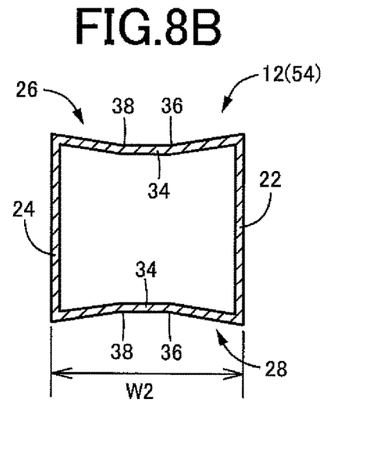

FIGS. 8A and 8B are sectional views corresponding to FIGS. 2A and 2B. A vehicle bumper reinforcement 90 is different from the above embodiment in that the vehicle bumper reinforcement 90 does not have the ribs 30, 32 and has a quadrilateral tubular shape having a simple substantially square section. In such a vehicle bumper reinforcement 90 as well, a hollow extruded material 92 having a narrow sectional shape shown in FIG. 8A is widened in its both longitudinal ends as shown in FIG. 8B in a manner similar to that of the above embodiment. Widened portions 54 in which the outer side plate 22 has been bent toward the front side of the vehicle so as to be separated further from the inner side plate 24 are thus formed, and the tilted ends 12 are formed by the widened portions 54.

Figure 9A:
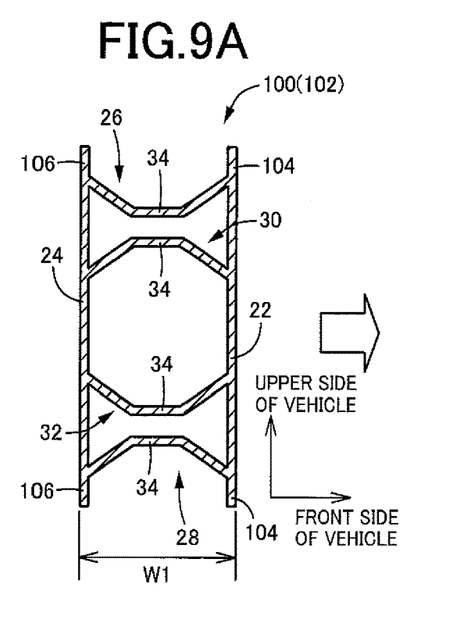
FIGS. 9A and 9B are sectional views of still another vehicle bumper reinforcement manufactured according to the present method.
Figure 9B:
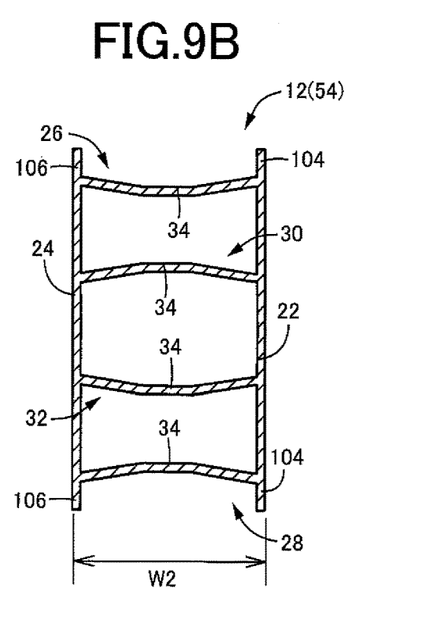

FIGS. 9A and 9B are sectional views corresponding to FIGS. 2A and 2B. A vehicle bumper reinforcement 100 is different from the above embodiment in that flanges 104, 106 extending outward are formed at both ends of the outer and inner side plates 22, 24. In such a vehicle bumper reinforcement 100 as well, a hollow extruded material 102 having a narrow sectional shape shown in FIG. 9A is widened in its both longitudinal ends as shown in FIG. 9B. Widened portions 54 in which the outer side plate 22 has been bent toward the front side of the vehicle so as to be separated further from the inner side plate 24 are thus formed, and the tilted ends 12 are formed by the widened portions 54. In the present embodiment, as shown in FIG. 10, the hollow extruded material 102 may be widened by deformation by pressing the outer side plate 22 against the forming surface 68 by the punches 66 with the flanges 106 on both sides of the inner side plate 24 being held between the die 60 and a pair of slide dies 108, 110. In this case, the hollow extruded material 102 can be partially widened not only in its longitudinal ends, but in any portion including its intermediate portion in the longitudinal direction of the hollow extruded material 102. FIG. 10 is a sectional view corresponding to the section taken along line IV-IV and viewed in the direction of arrows in FIG. 4.

Although the embodiments of the present invention are described above in detail based on the drawings, these embodiments are shown by way of example only, and the present invention can be embodied in various modified or improved forms based on the knowledge of those skilled in the art.

REFERENCE SIGNS LIST 10, 70, 80, 90, 100: Vehicle bumper reinforcement (Vehicle structure member) 12: Tilted ends 22: Outer side plate 24: Inner side plate 26, 74, 84: Upper connecting plate 28, 76, 85: Lower connecting plate 30, 32, 86, 87: Rib (Connecting plate) 34: Perpendicular portion 36, 38: Bend 50, 72, 82, 92, 102: Hollow extruded material 52: Through hole 54: Widened portion 66: Punch W1, W2: Width dimension

The invention claimed is:

1. A method for manufacturing a vehicle structure member by using a hollow extruded material that has a pair of side plates and a plurality of connecting plates connecting the side plates together and that has a quadrilateral closed section and a longitudinal shape, such that a width dimension of the vehicle structure member, which is a distance between the side plates, varies in a longitudinal direction of the vehicle structure member, the method comprising:
  an extrusion molding step of producing the hollow extruded material with the connecting plates each having a bent shape by extrusion molding; and
  a widening step of increasing the width dimension by increasing the distance between the side plates partially in the longitudinal direction so as to flatten the connecting plates having the bent shape wherein
  in the widening step, a through hole is formed in one of the side plates, a punch is inserted through the through hole, and with the one side plate being held, the punch is moved to contact the other side plate to move the side plates away from each other, so that the width dimension is increased.

2. The method according to claim 1, wherein the connecting plates each have a perpendicular portion formed in its intermediate portion in an attitude perpendicular to the side plates, and have bends at two positions on both sides of the perpendicular portion.

* * * * *